(12) United States Patent
Ranganathan et al.

(10) Patent No.: US 9,053,372 B2
(45) Date of Patent: Jun. 9, 2015

(54) ROAD MARKING DETECTION AND RECOGNITION

(75) Inventors: Ananth Ranganathan, Mountain View, CA (US); Tao Wu, Mountain View, CA (US)

(73) Assignee: Honda Motor Co., Ltd., Tokyo (JP)

( * ) Notice: Subject to any disclaimer, the term of this patent is extended or adjusted under 35 U.S.C. 154(b) by 332 days.

(21) Appl. No.: 13/586,086

(22) Filed: Aug. 15, 2012

(65) Prior Publication Data

US 2014/0003709 A1    Jan. 2, 2014

Related U.S. Application Data

(60) Provisional application No. 61/665,775, filed on Jun. 28, 2012.

(51) Int. Cl.
*G06K 9/00* (2006.01)

(52) U.S. Cl.
CPC ................................. *G06K 9/00798* (2013.01)

(58) Field of Classification Search
None
See application file for complete search history.

(56) References Cited

U.S. PATENT DOCUMENTS

| | | | |
|---|---|---|---|
| 2009/0088978 A1 | 4/2009 | Ishikawa et al. | |
| 2009/0232358 A1* | 9/2009 | Cross | 382/103 |
| 2010/0054538 A1 | 3/2010 | Boon | |
| 2010/0079590 A1 | 4/2010 | Kuehnle et al. | |
| 2010/0195914 A1* | 8/2010 | Isard et al. | 382/201 |
| 2010/0239123 A1* | 9/2010 | Funayama et al. | 382/103 |
| 2013/0114848 A1* | 5/2013 | Petrovic et al. | 382/100 |

FOREIGN PATENT DOCUMENTS

JP    2010-271964 A    12/2010

OTHER PUBLICATIONS

Sun et al. "Unsupervised video-based lane detection using location-enhanced topic models," published Oct. 2010.*
Mackeown et al. "Road Recognition with a Neural Network," published 1994.*
Foucher, P., et al., "Detection and Recognition of Urban Road Markings Using Images," in the 14th International IEEE Conference on Intelligent Transportation Systems, Strasbourg, France, Oct. 5-7, 2011, pp. 1747-1752.

(Continued)

*Primary Examiner* — Amir Alavi
*Assistant Examiner* — Alexander J Lesnick
(74) *Attorney, Agent, or Firm* — Fenwick & West LLP

(57) ABSTRACT

A system and method are disclosed for detecting road marking in a video using learned road marking templates. The system comprises a template learning module configured to learn the feature-based road marking templates from a set of training images. The template learning module is configured to rectify each training image, detect multiple regions of interest, and for each detected region of interest, detect multiple key points. The template learning module extracts feature vectors for the detected key points and builds the road marking templates from the feature vectors. The system also includes a road marking detection module for detecting road markings in a video at runtime using the learned road marking templates. During runtime, these templates are matched using a two-step process of first selecting promising feature matches and subsequently performing a structural matching to account for the shape of the road markings.

23 Claims, 9 Drawing Sheets

(56) References Cited

OTHER PUBLICATIONS

Kheyrollahi, A., et al., "Automatic real-time road marking recognition using a feature driven approach," Machine Vision and Applications, vol. 23, Issue 1, pp. 123-133, Jan. 2012.

Noda, M., et al., "Recognition of Road Markings from In-Vehicle Camera Images by a Generative Learning Method," The Institute of Electronics, Information and Communication Engineers, IEICE Tech. Rep., vol. 108, No. 263, pp. 31-36, Oct. 2008.

Vacek, S., et al., "Road-marking analysis for autonomous vehicle guidance," in Proceedings of the $3^{rd}$ European Conference on Mobile Robots, Freiburg, Germany, Sep. 19-21, 2007, pp. 1-6.

* cited by examiner

ROAD MARKING DETECTION AND RECOGNITION

CROSS REFERENCE TO RELATED APPLICATIONS

This application claims the benefit of U.S. Provisional Application No. 61/665,775, filed on Jun. 28, 2012, entitled "A Practical System for Road Marking Detection and Recognition," which is incorporated by reference in its entirety.

FIELD OF THE INVENTION

The invention relates generally to object identification in computer vision, and in particular to road marking detection and recognition using feature-based road marking templates.

BACKGROUND OF THE INVENTION

Road markings refer to the signs drawn on the surface of a road (e.g. speed limits, left-turn, right-turn, crossing, etc.), as opposed to traffic signs erected by the side or on top of roads. Road markings, as traffic signs, are important for navigation systems and driver assistive devices. While many road markings provide information that is redundant to traffic signs (e.g., speed limits), other information, such as arrows for turn-only lanes, are exclusively provided by road markings.

One existing method for road marking detection is based on lane detection techniques, such as the use of edges, regions, and tracking for continuity. For example, one existing lane detection method uses edges detected on an image to identify lane and road boundaries, leading to detection of intersections. The detected lane markers are used to guide road marking detection. However, this conventional method classifies the road markings after detecting them by computing the horizontal extent of the markings at different distances using scan lines. This method requires a lot of hand-coding for each type of road marking and does not scale well to a large number of road marking types.

Another conventional solution uses different methods to detect rectilinear markings and non-rectilinear markings such as arrows. However, this method is too slow to use in real-time for road marking detection. Methods, such as the ones listed above, which rely on lane marking detections, cannot work when lane markings are absent. Additionally, changes in lighting and road surface can affect the performance of the conventional methods. Detecting road markings with multiple disconnected components, especially when they are surrounded by other markings on the road, is an even more challenging task faced by these conventional methods.

Another conventional method generates a number of images of an ideal template under different illumination, scale, blur, and motion blur and matches this set of generated images to the candidate region in a test image. This matching is performed using an eigenspace technique. However, the method is reliant on the proper cropping and centering of the road marking, which does not provide efficient and practical road marking detection when operating in real-time with complex road markings.

Figure 1:
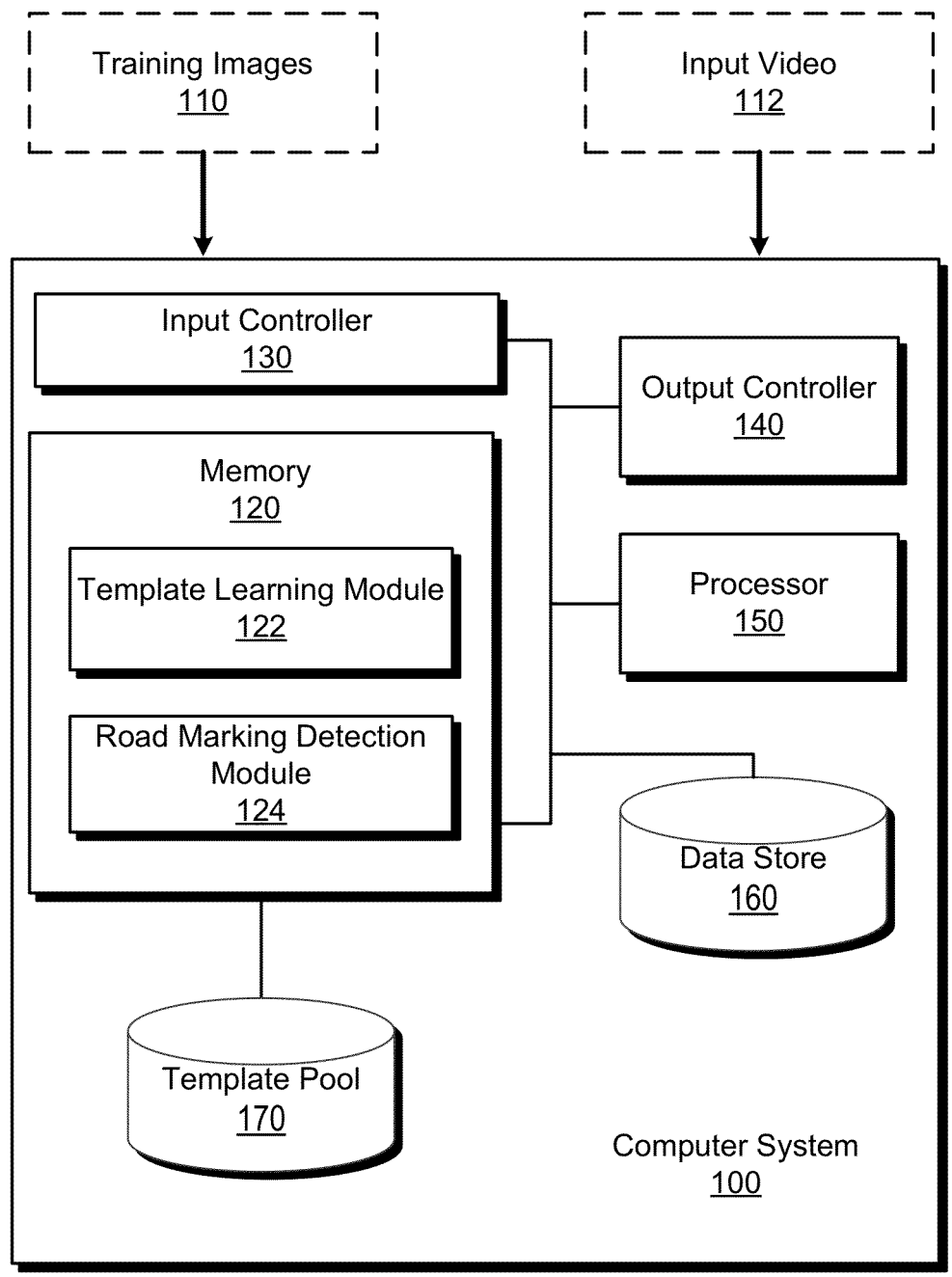
FIG. 1 illustrates a computer system for road marking detection and recognition according to one embodiment of the invention.

The figures depict various embodiments of the invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

An embodiment of the invention is now described with reference to the figures where like reference numbers indicate identical or functionally similar elements.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the invention include process steps and instructions described herein in the form of an algorithm. It should be noted that the process steps and instructions of the invention could be embodied in software, firmware or hardware, and when embodied in software, could be downloaded to reside on and be operated from different platforms used by a variety of operating systems.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the invention is not described with reference to any particular programming language. It will be appreciated that a variety of programming languages may be used to implement the teachings of the invention as described herein, and any references below to specific languages are provided for disclosure of enablement and best mode of the invention.

In addition, the language used in the specification has been principally selected for readability and instructional purposes, and may not have been selected to delineate or circumscribe the inventive subject matter. Accordingly, the disclosure of the invention is intended to be illustrative, but not limiting, of the scope of the invention, which is set forth in the claims.

Embodiments of the invention provide a road marking detection method and system using feature-based road marking templates. One embodiment of the disclosed system includes a template learning module configured to learn the feature-based road marking templates from a set of training images. The template learning module is configured to rectify each training image, detect multiple regions of interest, and for each detected region of interest, detect multiple key points. The template learning module extracts feature vectors for the detected key points and builds the road marking templates from the feature vectors.

One embodiment of the disclosed system also includes a road marking detection module for detecting road markings in a video at runtime using the learned road marking templates. During runtime, these templates are matched using a two-step process of first selecting promising feature matches and subsequently performing a structural matching to account for the shape of the markings.

System Overview

Embodiments of the invention provide an efficient road marking detection system using feature-based road marking templates. The road marking detection system learns feature-based road marking templates using a large set of training images. During runtime, each video frame of an input video is analyzed by matching the features extracted from the video frame with the features associated with each road marking template. Based on the feature matching, the system performs a structural matching to account for the shapes of the road markings. This road marking detection method seamlessly handles complex road markings with multiple disconnected components such as the railroad marking shown in FIG. 6. Further it is efficient to run in real time without using special hardware such as graphic processing units (GPUs), and scales well with the number of types of road markings to be detected.

FIG. 1 illustrates a computer system 100 for road marking detection and recognition according to one embodiment of the invention. The computer system 100 comprises a memory 120, an input controller 130, an output controller 140, a processor 150, a data store 160 and a road marking template pool 170. In one embodiment, the computer system 100 is configured to receive a set of training images 110 for learning a set of road marking templates and is configured to receive an input video 112 at runtime for road marking detection using the learned road marking templates.

The training images 110 (also referred to as "road marking template images" or "template images" interchangeably) comprise a large collection of pre-labeled images. In one embodiment, the training images 110 were collected using a camera mounted on a roof rack of a vehicle and facing forwards. The camera was calibrated and the calibration information is available as part of the dataset. The vehicle was driven on urban and suburban roads of California, the United States, and the videos of the road scenes were recorded at 800×600 resolution. For example, 29 videos collected contain a total of 28614 frames. A subset of the road markings appearing in the videos were manually annotated and amount to a dataset of 1208 annotated road markings To simplify the video annotation, only one in every 5-10 frames was annotated.

In one embodiment, 22 images from the collected video frames were selected as the road marking templates, which contain ten different commonly found types of road markings, including speed limit signs "35" and "40", "left turn", "right turn" and "forward" arrows, and "bike", "stop", "ped", "xing" and "rail" signs. Each road marking template represents the ground truth of a particular type of road marking (e.g., left turn).

The input video 112 comprises a video having multiple video frames, each of which contains zero, one or more road markings to be detected. In one embodiment, the input video 112 was captured using an in-car camera. Each of the captured video frames is recorded at 800×600 resolution. The in-car camera may be calibrated or uncalibrated.

The memory 120 stores data and/or instructions that may be executed by the processor 150. The instructions may comprise code for performing any and/or all of the techniques described herein. Memory 120 may be a DRAM device, a static random access memory (SRAM), Flash RAM (non-volatile storage), combinations of the above, or some other memory device known in the art. In one embodiment, the memory 120 comprises a template learning module 122 and a road marking detection module 124. The template learning module 122 learns road marking templates from the training images 110 and stores the learned road marking templates in the template pool 170. The road marking detection module 124 detects road markings contained in the input video 112 using the learned road marking templates at runtime and updates the road marking template pool 170 from the runtime road marking detection. The data store 160 stores additional data (e.g., video frames) and/or instructions that may be executed by the processor 150.

Figure 2:
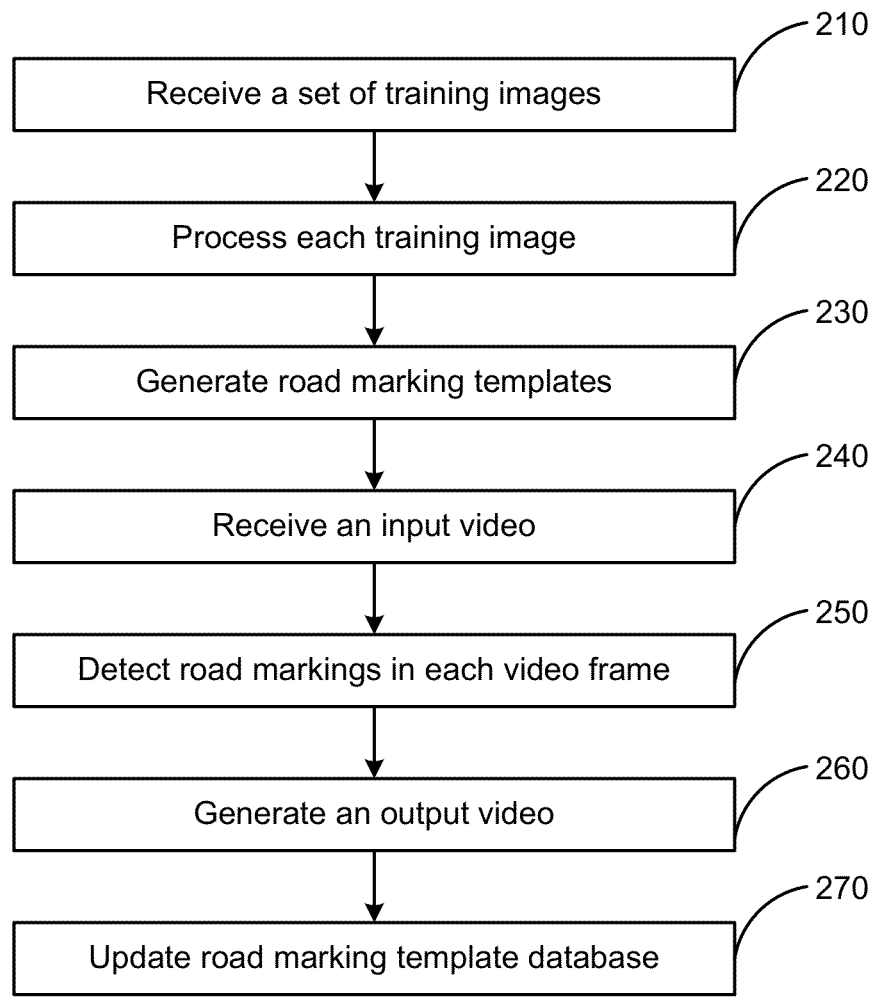
FIG. 2 is a system level flowchart of road marking detection and recognition according to one embodiment of the invention.

FIG. 2 is a system level flowchart of road marking detection and recognition according to one embodiment of the invention. Initially, the computer system 100 receives 210 a set of training images, processes 220 each training image by extracting feature vectors of a road marking contained in each training image, and generates 230 multiple road marking templates from the training images 110. At runtime, the computer system 100 receives 240 an input video having multiple video frames. The computer system 100 detects 250 zero, one or more road markings in each video frame using the learned road marking templates and generates 260 an output video with detected road markings recognized/labeled. The computer system 100 further updates 270 the road marking templates based on the runtime detection. The road marking templates learning is further described with references to FIGS. 3-6 and the runtime road marking detection is further described with references to FIGS. 7-9.

Road Marking Template Learning

The embodiments of efficient road marking detection use feature-based road marking templates, which are learned from a set of training images at a training phase. Each of the training images has a particular type of road marking (e.g., left turn) and a corresponding label of the road marking. The training/template images represent the ground truth of the road markings contained in the images.

Figure 3:
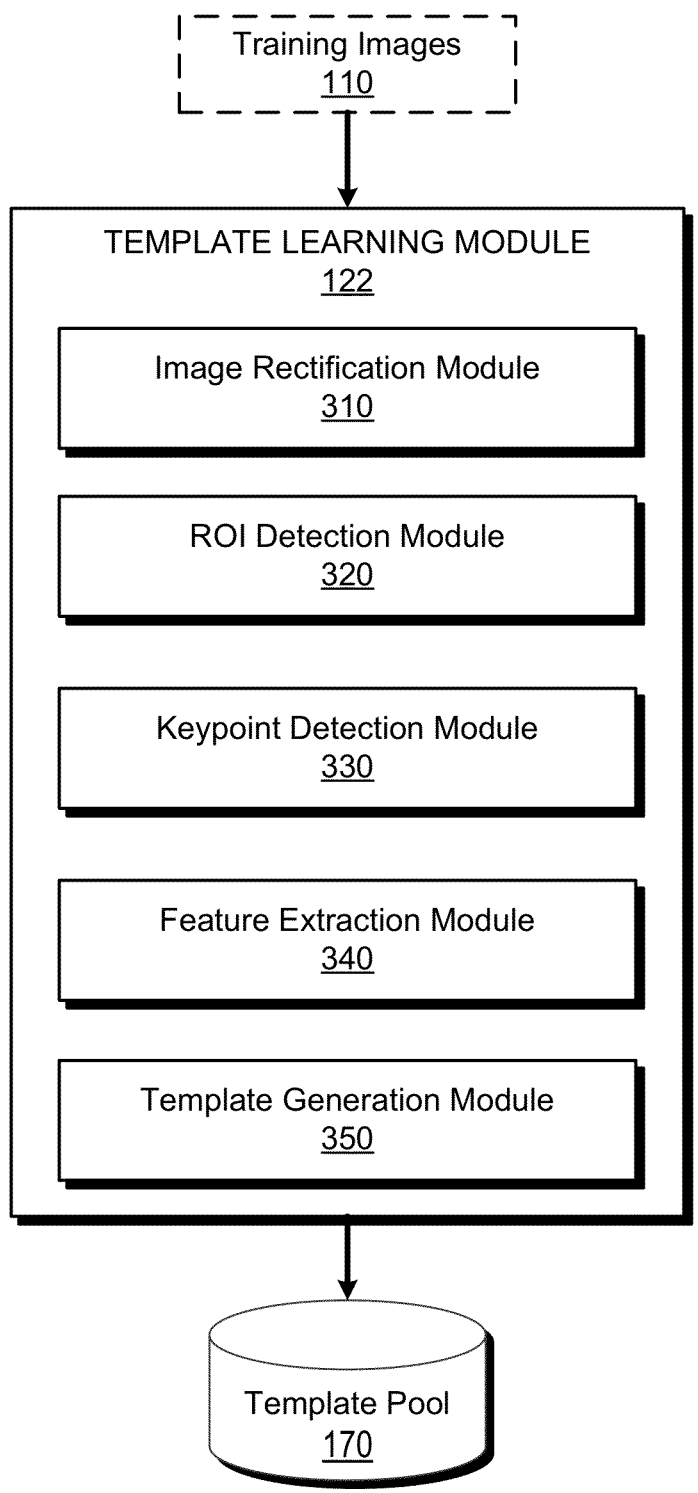
FIG. 3 is a block diagram of a template learning module for learning road marking templates according to one embodiment of the invention.

FIG. 3 is a block diagram of a template learning module 122 for learning road marking templates according to one embodiment of the invention. The template learning module 122 receives the training images 110, extracts feature vectors from the training images 110 and generates a set of feature-based road marking templates. The learned road marking templates are stored in the template pool 170 for runtime road marking detection.

In the embodiment illustrated in FIG. 3, the template learning module 122 comprises an image rectification module 310, a region of interest (ROI) detection module 320, a keypoint detection module 330, a feature extraction module 340 and a template generation module 350. Other embodiments may include different modules or additional modules for learning road marking templates.

Image Rectification

The image rectification module 310 comprises computer executable instructions for rectifying training images 110. For each training image, the image rectification module 310 is configured to rectify the training image by compensating the lens and perspective distortions of the camera, which captures the training image. In one embodiment, the camera used to capture the training images is mounted on a roof rack and points to the front of the vehicle. Due to this high viewpoint, there is some perspective distortion with distance. The image is rectified by using an inverse perspective transform that significantly reduces this distortion.

Figure 5:
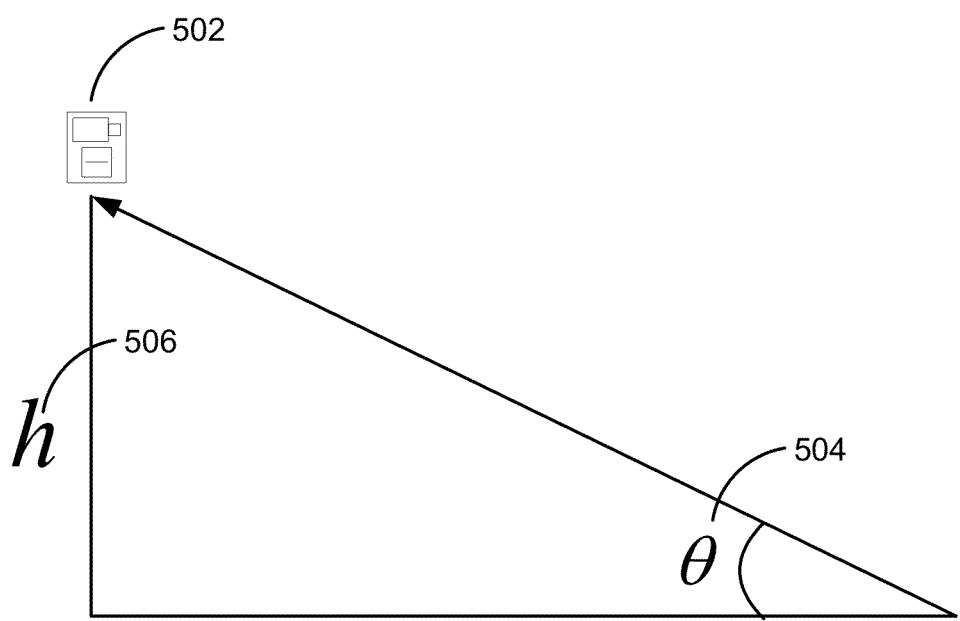
FIG. 5 is an example of a camera setting for image rectification according to one embodiment of the invention.

The inverse perspective transform works as follows. Let h 506 and θ 504 denote the height of the camera 502 and the angle of the camera against the ground respectively, as shown in FIG. 5. Given h and θ, a transform matrix A can be computed that transforms an image f(x, y) to its corresponding birds-eye view image g(u,v):

$$\begin{bmatrix} x' \\ y' \\ f \end{bmatrix} = A \begin{bmatrix} x \\ y \\ 1 \end{bmatrix}, u = \frac{x'}{f}, v = \frac{y'}{f} \quad (1)$$

To account for the lens distortions of the camera 502, the rectification module 310 calibrates the camera 502. Any existing camera calibration methods can be used to calibrate the camera and compute the lens distortion parameters. It is assumed that the camera 502 is mounted at a fixed height and fixed pitch angle on a vehicle when capturing the training images 110. Given these assumptions, a transform matrix can be obtained that converts the training images to the corresponding rectified birds-eye view images. In practice, the pitch angle and the height of the camera can be easily calibrated. Small errors on these two parameters can be tolerated during feature extraction of the training images 110.

Figure 6:
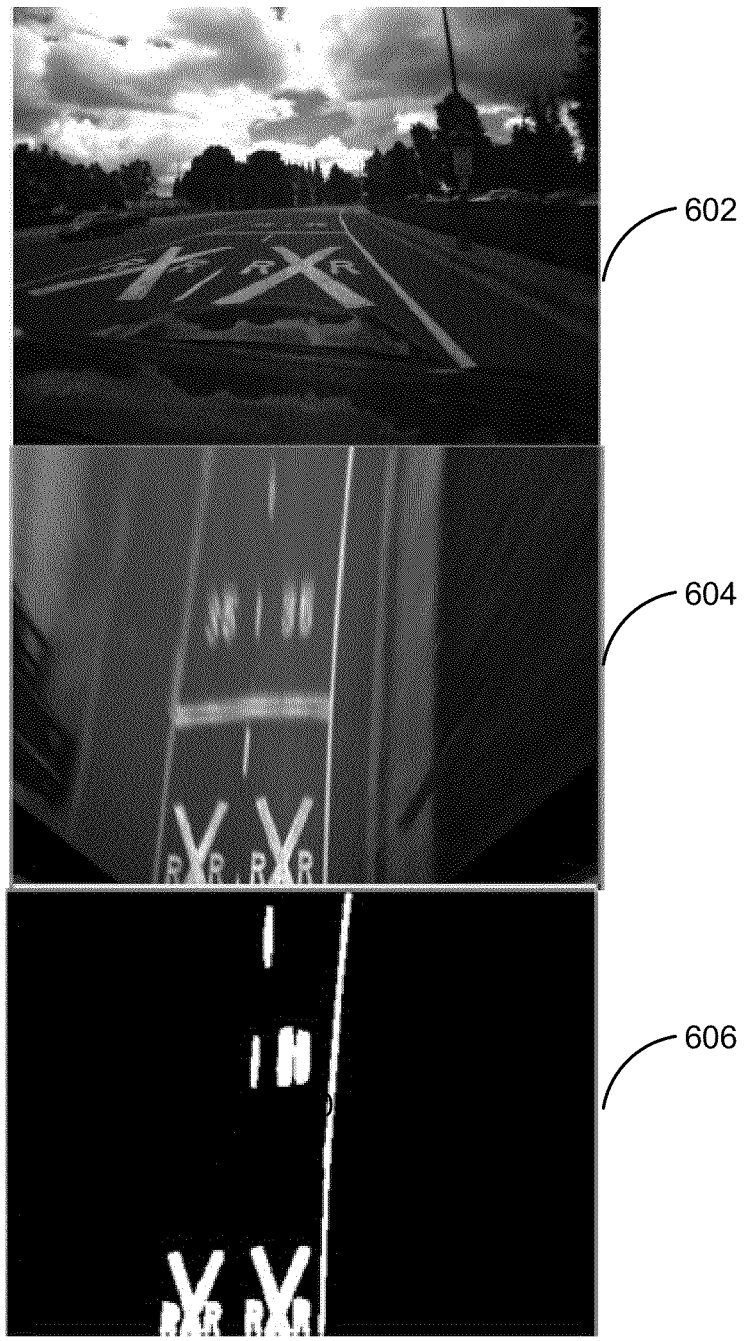
FIG. 6 illustrates examples of an original image, corresponding rectified image and detected regions of interest (ROIs) on the rectified image.

An example of the birds-eye view image resulting from the inverse perspective transform is shown in FIG. 6. Image 602 represents a training image containing complex railroad markings. Image 604 represents a corresponding rectified image with birds-eye view transformed using Equation (1). An advantage of computing the birds-eye view of a training image is that the template learning module 122 can directly compute the gradient on the training image to obtain the Histogram of Oriented Gradients (HOG) feature descriptors.

Region of Interest (ROI) Detection

The ROI detection module 320 comprises computer executable instructions for identifying one or more ROIs of a training image by pruning the training image to portions, which are good candidates for being road markings. A traffic scene image, especially in urban areas, often contains many objects such as vehicles, people, trees, etc., which are not of interest to road marking detection. Removing most of non-interest areas of an image, where the road markings are not likely to occur, improves the efficiency of the road marking detection computer system 100.

In one embodiment, the ROI detection module 320 detects interesting regions of a training image based on the observation that road markings are brighter than their immediate surroundings because they are designed to be seen easily. The ROI detection module 320 detects ROIs of a training image by detecting brighter regions of the training image. In one embodiment, the ROI detection module 320 uses a Maximally Stable Extremal Regions (MSERs) method to detect regions of interest. An MSER is a connected region that is extremal in the sense that the pixels inside the region are always brighter or darker than the pixels on the boundary. MSERs are computed by thresholding an image using a sequence of different threshold values, and then analyzing the areas of the obtained nested extremal regions. The maximally stable extremal region is determined when the rate of change of an area (in terms of pixel intensity value) with respect to the threshold value reaches a local minimum as compared to other areas.

In one embodiment, the ROI detection module 320 detects MSERs on the rectified training images. It is possible to detect almost all regions containing road markings in addition to some regions in other parts of a training image. However, these spurious detections do not pose a problem to the feature-based road marking detection because the spurious detections are pruned by the operations of key point detection and feature extractions described below.

It is noted that MSERs are stable across illumination and viewpoint changes. Conventionally, viewpoint invariant matching is achieved by fitting eclipses to the MSER regions, transforming the eclipse regions to circular regions, and extracting local feature vectors. These kinds of methods that achieve rotation invariance actually introduce an ambiguity on the orientation of the patch. The resulting rotation invariance is undesirable because if a road sign detector were rotation invariant, it would not distinguish between a sign in the current lane and one in the opposite lane. This could cause accidents if the vehicle is navigated into the opposite lane. Hence, in one embodiment, the ROI detection module 320 does not transform the MSERs into elliptical regions. Image 606 illustrated in FIG. 6 shows a corresponding image of the training image 602 with multiple ROIs identified, where the brighter areas represent the detected ROIs.

Point of Interest (POI) Detection

The POI detection module 330 comprises computer executable instructions for identifying one or more POIs of a training image by detecting feature description key points of ROIs in the training image. In one embodiment, the POI detection module 330 extracts a set of feature points from the ROIs of a training image using a Feature from Accelerated Segment Test (FAST) corner detector. The FAST corner detector approaches feature detection as a pattern classification problem where the neighbors of each pixel are used as features for the pixel. A tree classifier is trained on the pixel-level features using many training samples. The ROI detection module 330 applies the FAST corner detector on the regions of interest of the rectified training images. Other feature detection schemes, such as scale-invariant feature transform (SIFT) key point detector, can also be used in other embodiments of POI detection.

Feature Extraction and Road Marking Template Generation

The feature extraction module 340 comprises computer executable instructions for extracting feature vectors for each detected POI. In one embodiment, a feature descriptor is extracted from the neighborhood of each detected POI. The size of the neighborhood is a configurable threshold, such as 15×15 pixels or 10×10 pixels centered on the POI. In one embodiment, the feature extraction module 340 computes the histogram of oriented gradients (HOG) descriptor for each POI. The HOG descriptor consists of a 128 dimensional feature vector computed using certain "optimal" scales and orientations of the image patch (e.g., 15×15 pixels neighborhood) around a POI. To simplify and speed up the determination of the optimal scales and orientations, the feature extraction module 340 extracts the HOG feature vectors at 3 fixed scales and 1 fixed orientation. For each scale, a 128 dimensional feature vector is extracted for each POI. By concatenating the features extracted at different scales, the feature extraction module 340 obtains the final 384-dimensional feature vector for each POI.

The template generation module 350 comprises computer executable instructions for generating road marking templates from the training images 110. A road marking template for a particular type of road marking (e.g., a left-turn) contains multiple POIs and their coordinates, the corresponding feature vectors describing each POI and a label of the road marking (e.g., "left-turn"). For a template of a road marking, the ROI containing the road marking has a label from the labeled ground-truth. After rectification, the POIs are detected within a labeled ROI. The feature vectors of each POI are extracted. The template generation module 350 collects information (e.g., POIs, feature vectors and label) of each road marking template and stores the collected information in the template pool 170 for runtime road marking detection.

Figure 4:
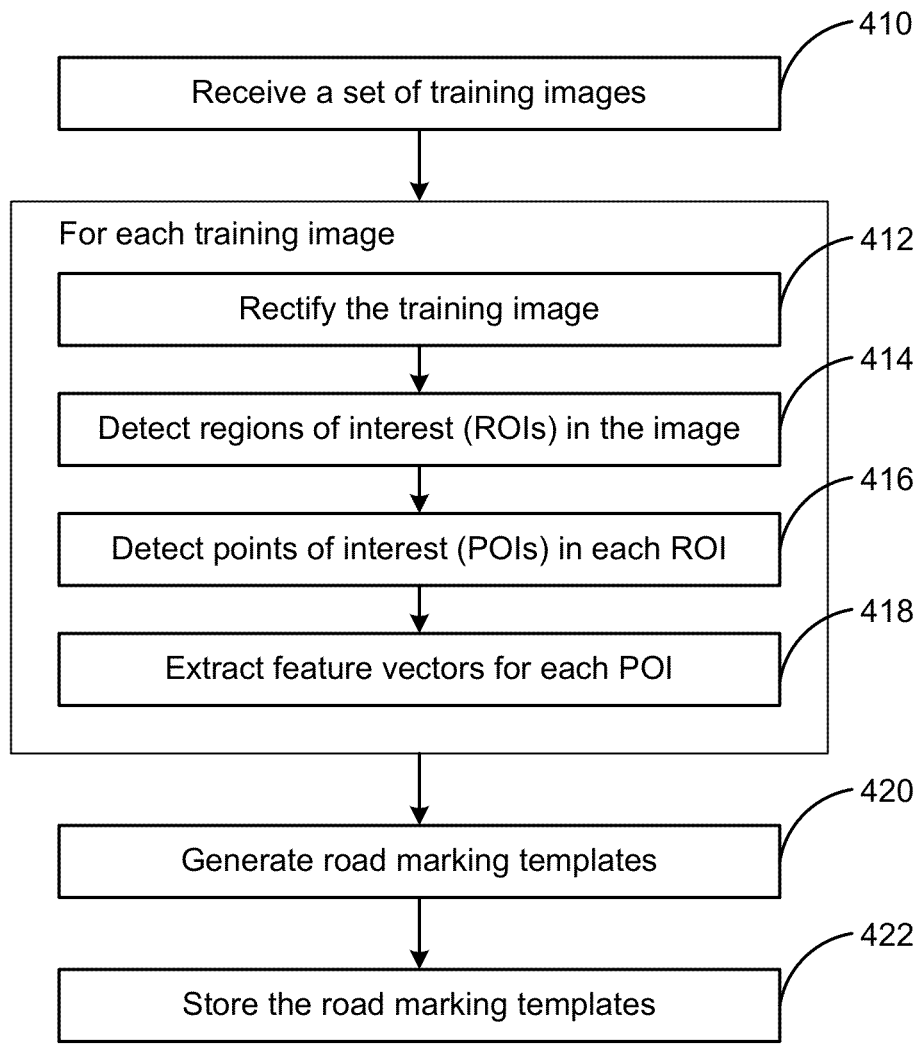
FIG. 4 is a flowchart of learning road marking templates according to one embodiment of the invention.

FIG. 4 is a flowchart of learning road marking templates according to one embodiment of the invention. Initially, the template learning module 122 receives 410 a set of training images, each of which contains a road marking and the road marking has a ground-truth label. For each training image, the image rectification module 310 rectifies 412 the training image by compensating the lens and perspective distortions of the camera, which captures the training image. The ROI detection module 320 detects 414 one or more ROIs on the training image. Each ROI of the training image represents a good candidate for being a road marking. The keypoint detection module 330 detects 416 POIs by detecting feature description key points in each ROI of the training image. The feature extraction module 340 extracts 418 feature vectors (e.g., HOGs feature vectors) for each POI from the pixels of the neighborhood of the POI. From the POIs, their corresponding feature vectors and the ground-truth labels of the road markings, the template generation module 350 generates 420 the road marking templates and stores 422 the road marking templates in a template storage (e.g., the template pool 170).

Runtime Road Marking Detection

The task of runtime road marking detection of an input video is to detect one or more road markings contained in each video frame of the input video. In one embodiment, the computer system 100 illustrated in FIG. 1 includes a road marking detection module 124 configured to use the learned road marking templates to perform road marking detection on the input video.

Figure 7:
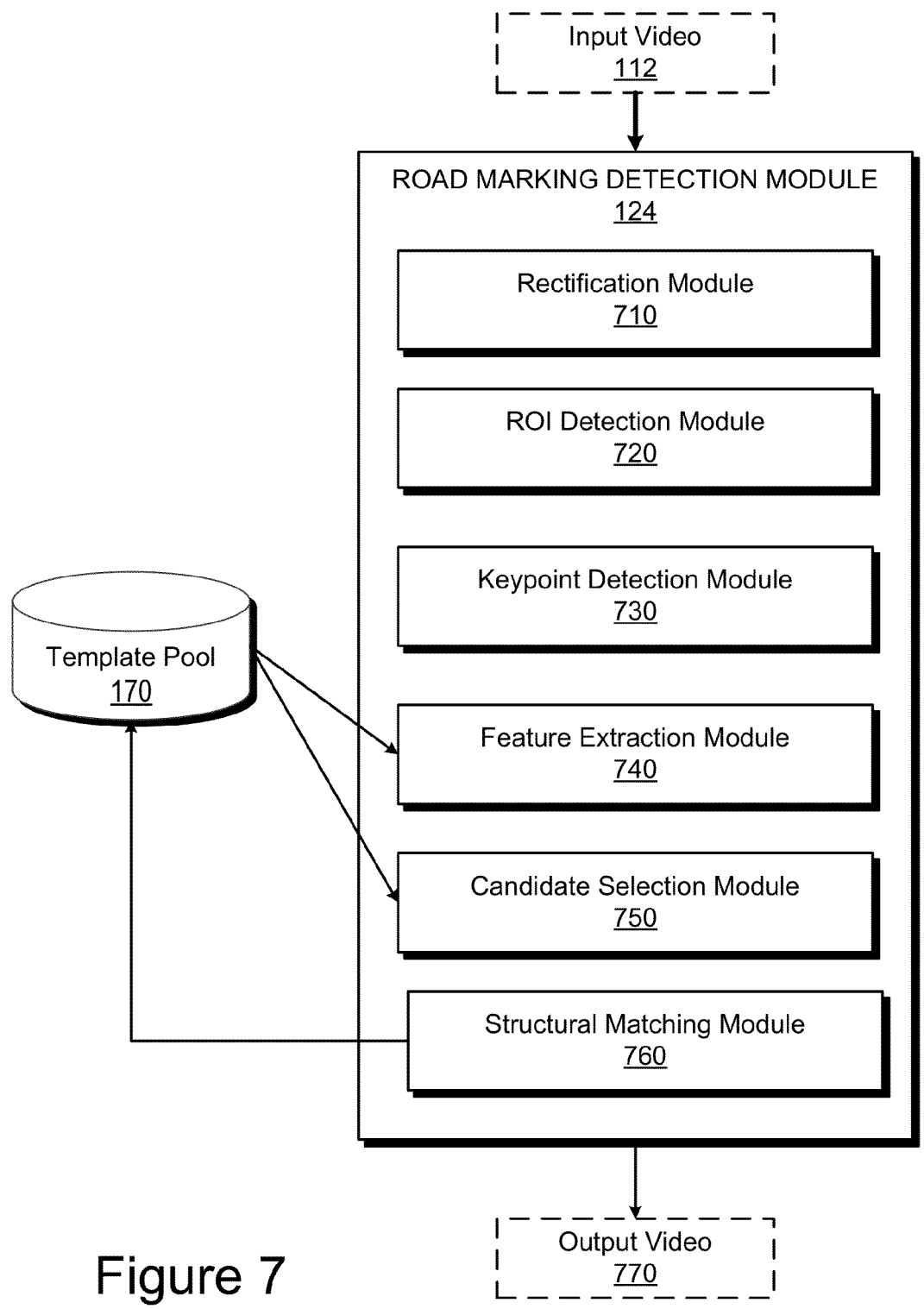
FIG. 7 is a block diagram of a road marking detection module for detecting road markings of an input video according to one embodiment of the invention.

FIG. 7 is a block diagram of a road marking detection module 124 for detecting road markings of an input video 112 according to one embodiment of the invention. The road marking detection module 124 includes a rectification module 710, a ROI detection module 720, a keypoint detection module 730, a feature extraction module 740, a candidate selection module 750 and a structural matching module 760. The road marking detection module 124 is configured to receive the input video 112 comprising multiple video frames and detect the road markings contained in the video frames using the road marking templates learned by the template learning module 122.

For each video frame of the input video 112, the rectification module 710 is configured to rectify the video frame by compensating the lens and perspective distortions of the camera, which captures the video frame. In one embodiment, the rectification module 710 performs the same operations as the image rectification module 310 of FIG. 3. In other embodiments, the image rectification module 310 is shared by the template learning module 122 and the road marking detection module 124 for image/frame rectification.

The ROI detection module 720 is configured to identify one or more ROIs of a video frame of the input video 112 by pruning the video frame to portions, which are good candidates for being road markings. In one embodiment, the ROI detection module 720 performs the same operations (e.g., MSERs detection) as the ROI detection module 320 of FIG. 3. In other embodiments, the ROI detection module 320 is shared by the template learning module 122 and the road marking detection module 124 for ROIs detection.

The POI detection module 730 is configured to identify one or more POIs of a video frame of the input video 112 by detecting feature description key points of ROIs in the video frame. In one embodiment, the POI detection module 730 performs the same operations (e.g., FAST corner detection) as the POI detection module 330 of FIG. 3. In other embodiments, the POI detection module 330 is shared by the template learning module 122 and the road marking detection module 124 for POIs detection.

The feature extraction module 740 is configured to extract feature vectors for each detected POI of a video frame of the input video 112. In one embodiment, the feature extraction module 740 performs the same operations (e.g., HOG feature descriptor computation) as the feature extraction module 340 of FIG. 3. In other embodiments, the feature extraction module 340 is shared by the template learning module 122 and the road marking detection module 124 for feature extraction.

In a road scene video frame of the input video 112, there may be multiple different road markings (e.g., left-turn sign and right-turn sign). Moreover, a single type of road marking may appear at multiple locations in a video frame of the input video 112. Thus, a template for a particular type of road marking may have multiple matched patches (e.g., portions) in a video frame of the input video 112. For example, some of the POIs detected in a video frame of the input video 112 may not be detected in the road marking template image and vice versa because the POI detection modules does not have 100% repeatability between the video frame and the road marking template image. Hence, usually a subset of POIs in the video frame matches a subset of the POIs in the template.

Multiple Candidate Feature Matching

To identify road markings contained in a video frame based on the matching of the detected POIs in the video frame with the POIs of the learned road marking templates, the road marking detection module 124 computes the POI matching in two steps: computing putative matching pairs of POIs based on their feature vectors, and refining the putative matching through a structural matching algorithm that matches the two-dimensional (2D) geometry (e.g., shape) of the POIs within a road marking.

The candidate selection module 750 comprises computer executable instructions for computing putative matching pairs of POIs of a video frame of the input video 112. The putative matching of POIs provides multiple possible matching pairs based on the feature vectors of the POIs. Let N and M denote the number of POIs in two images, a test image (e.g., a video frame of the input video 112) and a template image (e.g., a road marking template stored in the template pool 170) respectively. The Euclidean distance matrix $D_{N \times M}$ between the two sets of POIs of the test image and the template image using their feature vectors is calculated. The entry at the ith row and the jth column of D, $d_{i,j}$, is the distance between the features of the ith POI in the test image and the jth POI in the template image.

The candidate selection module 750 uses the ratio between the smallest distance and the second smallest distance to choose possible matching points. The candidate selection module 750 uses this criterion to divide the POIs in the template image to a possibly matched subset $S_{match}$ and a possibly non-matched subset $S_{non\ match}$. The distances to the possibly matched POIs are usually smaller than the distances to the non-matched POIs. Due to efficiency considerations, the candidate selection module 750 uses a simple criterion to determine $S_{match}$ and assume that:

$$\frac{\min_{j \in S_{nonmatch}} d_{i,j}}{\max_{j \in S_{match}} d_{i,j}} > \alpha, \quad (2)$$

where $\alpha$ is a user-defined threshold. In one embodiment, $\alpha$ is set to 1.3.

Let $D'_i = [d_{i,J_1}, \ldots, d_{i,J_j}, \ldots d_{i,J_M}]$ denote the vector of the ith row of D sorted in ascending order. The ratios $R = [r_1, \ldots, r_j, \ldots r_{1M-1}]$ between the adjacent entries in $D'_i$ are calculated as $r'_i = [d'_{i,J_{j+1}}/d'_{i,J_j}]$. If $r_{jk}$ is the first entry in $r_j$ that satisfy Equation (2), the $J_1{}^{th}$ to $J_K{}^{th}$ POIs in the first image are the matching candidates to the ith POI in the second image.

Using threshold may make the putative matching not symmetric. For greater robustness, the candidate selection module 750 first matches the test image against the template image, and subsequently matches the template image against the test image similarly. For example, a pair of features (A, B), where A is a POI in the test image and B is a POI in the template image, is counted as a matching edge if A is a matching candidate for B and B is a matching candidate for A. All the matching edges and the coordinates of the candidate POIs are sent to the structural matching module 760 to determine if any subset of the POIs in the test image has the same geometric layout (e.g., shape) as in the template image.

Structural Matching

The structural matching module 760 comprises computer executable instructions for computing structural matching based on the putative matching of the POIs of a video frame of the input video 112 and the POIs of a road marking template. Given the matching edges between two set of POIs, structural matching module 760 determines which subset of the matching edges is actually part of the road marking in the template image. In one embodiment, the structural matching modules 760 solves the problem recursively. The idea is that for a subset of the matching edges, the POIs involved in the test image and the template form two shapes respectively. The structural matching module 760 calculates a matching cost between the two shapes to decide if they have the same geometric structure.

Figure 8:
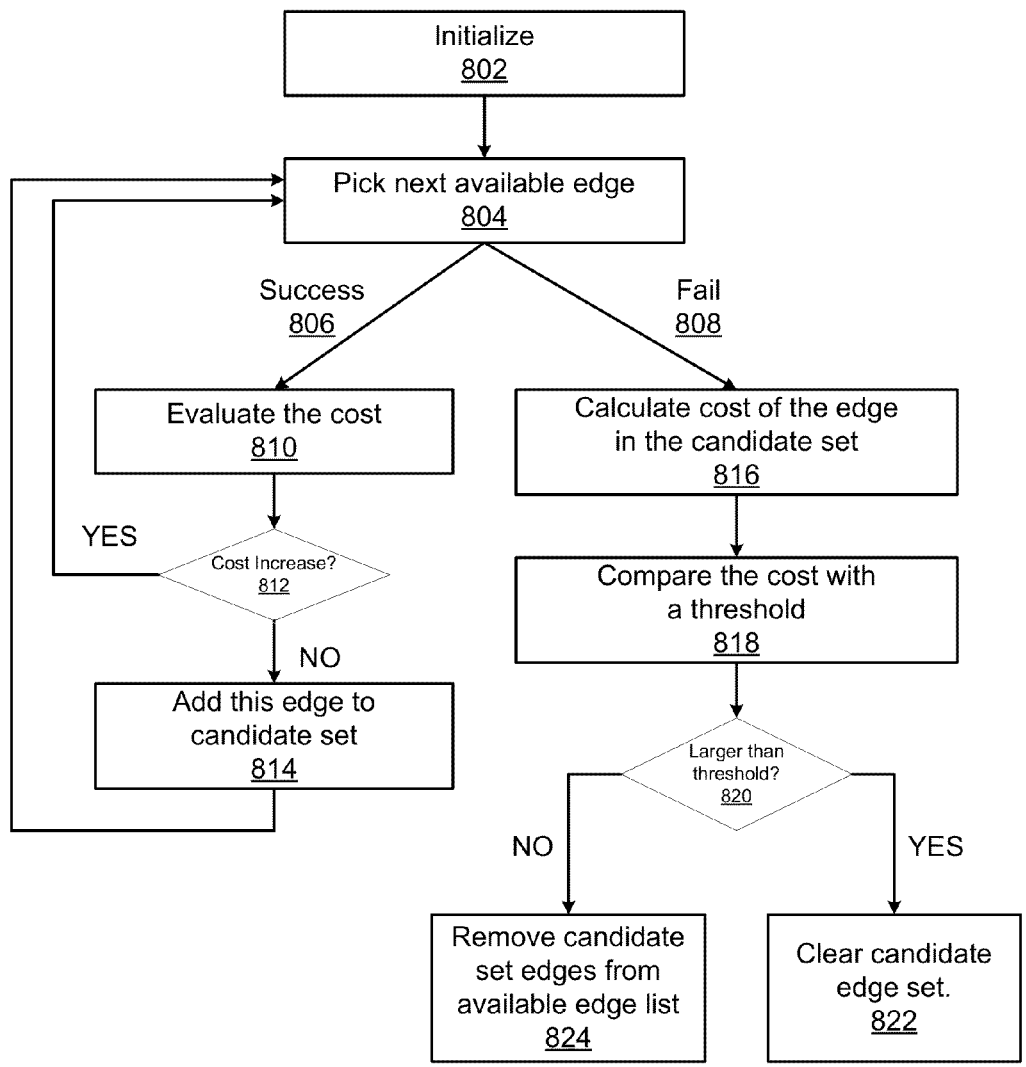
FIG. 8 is a flowchart of structural matching for road marking detection of an input video according to one embodiment of the invention.

FIG. 8 is a flowchart of structural matching for road marking detection of an input video according to one embodiment of the invention. Initially, the structural matching module 760 is initialized 802 with a list of all available edges among the POIs and an empty set of candidate edges. The structural matching module 760 picks 804 a next available edge and evaluates 810 the cost of adding the edge to the set of candidate edges. A new available edge is added (814) to the candidate edge set if the matching cost of the new candidate edge set (with the available edge added) is lower than the current candidate set. If the cost of the edge being evaluated is larger than the current candidate set, the structural matching module 760 picks 804 the next available edge for evaluation. In one embodiment, the structural matching module 760 may terminate the evaluation process regardless of the outcome of the evaluation such that the edge is marked unavailable and edge is not picked up again.

When no more edges are available (808), the structural matching module 760 calculates 816 the matching cost of the candidate set and compares 818 the cost with a threshold value $\beta$. In one embodiment, $\beta$ is set to 0.01. If the cost is smaller than the threshold $\beta$, the edges in the candidate set form a matched road marking with the same label as the template. These edges and the corresponding POIs are removed (824) from the available edge list for further consideration. If the cost is larger than the $\beta$, the candidate edge set is cleared (822) and only the first edge in the candidate set is removed from the available edge list for further consideration.

The above procedure is repeated for each road marking template until no edges remain in consideration. The result being the positions of all the detected regions of each road marking template in the test image. The structural matching module 760 determines the types of the road marking contained in the video frame based on the matching results.

The template images are usually slightly different from the road markings seen in input videos due to changes in lighting, road condition etc. To reduce the performance impact by the difference in appearance of the road markings, the road marking detection module 124 adopts a simple rule to learn new templates during runtime. When a major part of a template is detected in a video frame of the input video 112 and the cost is greater than a threshold $\gamma$, the video frame is added to the template pool 170 as a road marking template. This ensures that good candidates get automatically added to the template pool 170. In this expedient manner, the computer system 100 can adapt to changing conditions during runtime for road marking detection.

Cost Function

The structural matching module 760 uses a cost function to select POIs. In one embodiment, the cost function is terms of the distance between the two shapes formed by sets of POIs from a video frame and a road marking template. Specifically, given the coordinates of the POIs, the structural matching module 760 measures the distance between the two shapes formed by sets of POIs by applying a Procrustes analysis. The Procrustes analysis consists of centeroid alignment, scaling and rotational normalization. The position of the center of a shape is the mean of the x and y coordinates of all the POIs:

$$\bar{x} = \frac{1}{K}\sum_{k=1}^{K} x_k, \bar{y} = \frac{1}{K}\sum_{k=1}^{K} y_k \qquad (3)$$

Thus, the centers of both shapes can be aligned by simply subtracting the means from the coordinates:

$$S' = S - 1[\bar{x}\bar{y}] \qquad (4)$$

where 1 is a K dimensional column vector with each element equals to 1. After the center of the shapes are aligned and moved to the origin, the scale factor s of a shape is defined by the square root of the central moment:

$$s = \sqrt{\sum_{k=1}^{K} x_k^2 + \sum_{k=1}^{K} y_k^2} \qquad (5)$$

Then the size of each shape can be normalized by dividing the coordinates of all the contained points by the scale factor:

$$x'_k = x_k/s, y'_k = y_k/s \qquad (6)$$

Take a pair of shapes as an example. Assume one shape $S_1$ is fixed, then for the other shape $S_2$, the difference angle $\theta$ between the orientations of the two shapes can be solved by minimizing the distance between the two shapes after $S_2$ is rotated by $\theta$. The coordinates of the ith landmark in $S_2$ after rotated by angle $\theta$ are:

$$[x_{2,i}^1 y_{2,i}^1] = [x_{2,i} y_{2,i}]A \qquad (7)$$

where $$A = \begin{bmatrix} \cos\theta & \sin\theta \\ -\sin\theta & \cos\theta \end{bmatrix}$$

is a rotation matrix. The solution of this minimization is given by the singular value decomposition (SVD). Let the SVD result of $S_1^T S_2$ be:

$$U\Lambda V^T = S_1^T S_2 \qquad (8)$$

Then the rotation matrix A is given by $VU^T$, and the rotated shape of $S_2$ is obtained by $S'_2 = S_2 VU^T$. The cost function used in one embodiment is defined by:

$$dist = 1 - \sum_i \lambda_i^2 \qquad (9)$$

where $\lambda_i$ is the ith entry in the diagonal of $\Lambda$. Hence, the more similar the two shapes are, the lower the value of the cost function.

Figure 9:
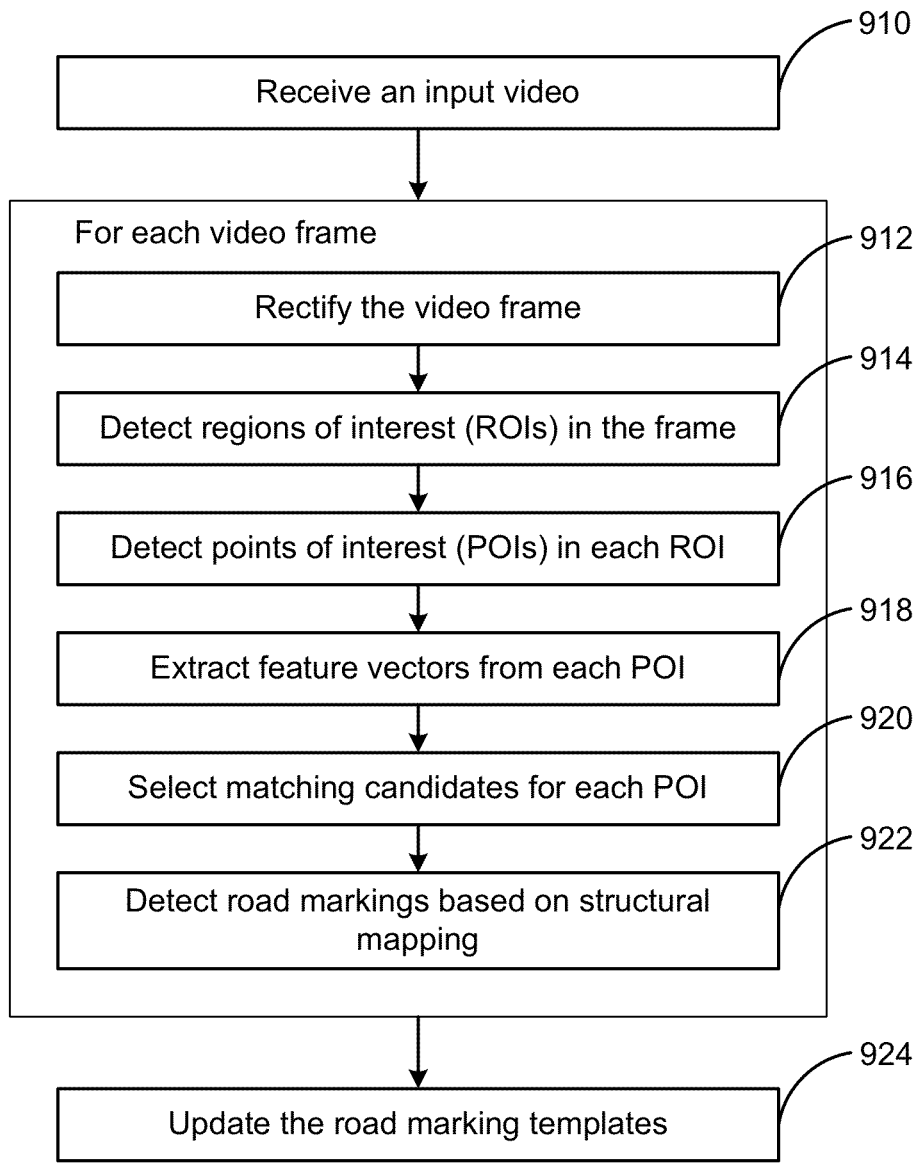
FIG. 9 is a flowchart of detecting road markings of an input video according to one embodiment of the invention.

FIG. 9 is a flowchart of detecting road markings of an input video according to one embodiment of the invention. Initially, the road marking detection module 124 receives 910 an input video comprising multiple video frames, each of which contains one or more road markings. For each video frame, the rectification module 710 rectifies 912 the video frame by compensating the lens and perspective distortions of the camera, which captures the video frame. The ROI detection module 720 detects 914 one or more ROIs on the video frame. Each ROI of the video frame represents a good candidate for being a road marking. The keypoint detection module 730 detects 916 POIs by detecting feature description key points of in each ROI of the video frame. The feature extraction module 740 extracts 918 feature vectors (e.g., HOGs feature vectors) for each POI from the pixels of the neighborhood of the POI.

In a road scene video frame of the input video 112, there may be multiple different road markings (e.g., left-turn sign and right-turn sign). The candidate selection module 750 selects 920 one or matching candidates for each POI based on the putative matching of POI pairs (e.g., calculating the Euclidean distance matrix between the two sets of POIs of the video frame and a template image using their feature vectors). The matching results are filtered by the structural matching module 760 to detect road markings based on the similarity of the shapes formed by the POIs. The structural matching module 760 updates 924 the road marking templates learned from the runtime road marking detection.

Embodiments of the road marking detection system 100 advantageously detect road markings of an input video by using learned road marking templates. In particular, the system uses FAST corner features for defining the road marking templates. During runtime, these templates are matched using a two-step process of first selecting promising feature matches and subsequently performing a structural matching to account for the shape of the markings. This detection method seamlessly handles complex road markings with multiple disconnected components such as the railroad marking Additionally, the embodiments of the computer system 100 present a large database of road markings, captured using an in-car camera. The road marking dataset contains almost all the commonly found markings on the roads. Further, the dataset consists of videos rather than stand alone images. This addresses the common usage scenario on vehicles, and allows a robust evaluation of the road marking detection algorithms.

While particular embodiments and applications of the invention have been illustrated and described herein, it is to be understood that the invention is not limited to the precise construction and components disclosed herein and that various modifications, changes, and variations may be made in the arrangement, operation, and details of the methods and apparatuses of the invention without departing from the spirit and scope of the invention as it is defined in the appended claims.

What is claimed is:

1. A computer implemented method for detecting road markings in a video, the method comprising:
receiving a video comprising multiple digital representations of video frames,
wherein each video frame contains zero, one or more road markings;
for each video frame:
detecting one or more regions of interest on the video frame;
detecting one or more feature description key points in each detected region of interest;
extracting one or more feature vectors for each detected key point;
selecting one or more road marking candidates based on a comparison of the detected key points of the video frame and key points of a plurality of road marking templates;
detecting each road marking in the video frame based on the selected road marking candidates;
determining whether the video frame is qualified as a new road marking template based on detected road marking in the video frame, comprising:
determining amount of a road marking template of the plurality of the road marking template detected in the video frame based on the detected road marking in the video frame;
comparing a cost of adding the video frame as a road marking template with a threshold value; and
determining that the video frame is qualified as a road marking template responsive to the amount of the road marking template detected in the video frame exceeding a matching threshold and to the cost of adding the video frame exceeding a cost threshold; and
updating the plurality of the road marking templates by adding the video frame to the plurality of the road marking templates responsive to the video frame being qualified as a new road marking template.

2. The method of claim 1, further comprising:
rectifying each video frame of the video by compensating lens and perspective distortions of a camera that captures the video frame.

3. The method of claim 2, wherein rectifying a video frame comprises:
transforming the video frame to a corresponding image in a different viewpoint.

4. The method of claim 1, wherein detecting one or more regions of interest on the video frame comprises:
dividing the video frame into two sets of portions, wherein the pixels in the two sets of portions are different in pixel intensity; and
selecting the set of portions as the regions of interest based on rate of change of pixel intensity in the portions.

5. The method of claim 2, further comprising applying a maximally stable extremal regions analysis of the rectified video frame.

6. The method of claim 1, wherein extracting one or more feature vectors for detected key point comprises:
extracting the feature description key points using neighboring pixels of each key point.

7. The method of claim 1, wherein selecting one or more road marking candidates comprises:
measuring a distance between a set of detected key point of the video frame and a set of key points of each of a plurality of road marking templates based on the feature vectors of the key points; and
dividing the key points of a road marking template of the plurality of the road marking template into a matched subset and a non-matched subset based on the distance measure.

8. The method of claim 1, wherein detecting each road marking in the video frame based on the selected road marking candidates comprises:
comparing a shape formed by the selected key points of the video frame and a shape formed by the corresponding key points of one of the road marking template of the plurality of the road marking templates;
determining the types of road markings contained in the video frame based on the comparison of the shapes; and
computing a cost of selecting the shape formed by the selected key points of the video frame as a road marking contained in the video frame.

9. The method of claim 1, further comprising:
receiving a set of training images, each training image contains a type of road marking and identification of the road marking; and
learning a plurality of road marking templates from the set of training images.

10. The method of claim 9, wherein learning the plurality of road marking templates comprises:
for each training image:
rectifying the training image by compensating lens and distortion of a camera that captures the training image;
detecting one or more regions of interest on the training image;
detecting one or more feature description key points in each detected region of interest;
extracting one or more feature vectors for each detected key point;
generating the plurality of road marking templates from the extracted feature vectors of the detected key points; and
storing the plurality of road marking templates for runtime road marking detection.

11. A non-transitory computer-readable medium containing executable computer program code for detecting road markings in a video, the computer program code comprising code for:
receiving a video comprising multiple digital representations of video frames,
wherein each video frame contains zero, one or more road markings;
for each video frame:
detecting one or more regions of interest on the video frame;
detecting one or more feature description key points in each detected region of interest;
extracting one or more feature vectors for each detected key point;
selecting one or more road marking candidates based on a comparison of the detected key points of the video frame and key points of a plurality of road marking templates;
detecting each road marking in the video frame based on the selected road marking candidates;

determining whether the video frame is qualified as a new road marking template based on detected road marking in the video frame, comprising:
  determining amount of a road marking template of the plurality of the road marking template detected in the video frame based on the detected road marking in the video frame;
  comparing a cost of adding the video frame as a road marking template with a threshold value; and
  determining that the video frame is qualified as a road marking template responsive to the amount of the road marking template detected in the video frame exceeding a matching threshold and to the cost of adding the video frame exceeding a cost threshold; and
updating the plurality of the road marking templates by adding the video frame to the plurality of the road marking templates responsive to the video frame being qualified as a new road marking template.

12. The computer-readable storage-medium of claim 11, further comprising computer program code for:
rectifying each video frame of the video by compensating lens and perspective distortions of a camera that captures the video frame.

13. The computer-readable storage-medium of claim 1, wherein the computer program code for rectifying a video frame comprises computer program code for:
transforming the video frame to a corresponding image in a different viewpoint.

14. The computer-readable storage-medium of claim 11, wherein the computer program code for detecting one or more regions of interest on the video frame comprises computer program code for:
dividing the video frame into two sets of portions, wherein the pixels of the two sets of portions are different in pixel intensity; and
selecting the set of portions as the regions of interest based on rate of change of pixel intensity in the portions.

15. The computer-readable storage-medium of claim 13, further comprising computer program code for applying a maximally stable extremal regions analysis of the rectified video frame.

16. The computer-readable storage-medium of claim 11, wherein the computer program code for extracting one or more feature vectors for detected key point comprises computer program code for:
extracting the feature description key points using neighboring pixels of each key point.

17. The computer-readable storage-medium of claim 11, wherein the computer program code for selecting one or more road marking candidates comprises computer program code for:
measuring a distance between a set of detected key point of the video frame and a set of key points of each of a plurality of road marking templates based on the feature vectors of the key points; and
dividing the key points of a road marking template of the plurality of the road marking template into a matched subset and a non-matched subset based on the distance measure.

18. The computer-readable storage-medium of claim 11, wherein the computer program code for detecting each road marking in the video frame based on the selected road marking candidates comprises computer program code for:
comparing a shape formed by the selected key points of the video frame and a shape formed by the corresponding key points of one of the road marking template of the plurality of the road marking templates;
determining the types of road markings contained in the video frame based on the comparison of the shapes; and
computing a cost of selecting the shape formed by the selected key points of the video frame as a road marking contained in the video frame.

19. The computer-readable storage-medium of claim 11, further comprising computer program code for:
receiving a set of training images, each training image contains a type of road marking and identification of the road marking; and
learning a plurality of road marking templates from the set of training images.

20. The computer-readable storage-medium of claim 19, wherein the computer program code for learning the plurality of road marking templates comprises computer program code for:
for each training image:
  rectifying the training image by compensating lens and distortion of a camera that captures the training image;
  detecting one or more regions of interest on the training image;
  detecting one or more feature description key points in each detected region of interest;
  extracting one or more feature vectors for each detected key point;
generating the plurality of road marking templates from the extracted feature vectors of the detected key points; and
storing the plurality of road marking templates for runtime road marking detection.

21. A computer system for detecting road markings in a video, the system comprising:
a road marking detection module configured to:
receive a video comprising multiple digital representations of video frames,
  wherein each video frame contains zero, one or more road markings;
for each video frame:
  detect one or more regions of interest on the video frame;
  detect one or more feature description key points in each detected region of interest;
  extract one or more feature vectors for each detected key point;
  select one or more road marking candidates based on a comparison of the detected key points of the video frame and key points of a plurality of road marking templates;
  detect each road marking in the video frame based on the selected road marking candidates;
  determine whether the video frame is qualified as a new road marking template based on detected road marking in the video frame, comprising:
    determine amount of a road marking template of the plurality of the road marking template detected in the video frame based on the detected road marking in the video frame;
    compare a cost of adding the video frame as a road marking template with a threshold value; and
    determine that the video frame is qualified as a road marking template responsive to the amount of the road marking template detected in the video frame exceeding a matching threshold and to the cost of adding the video frame exceeding a cost threshold; and update the plurality of the road marking templates by adding the video frame to the plurality of the road marking templates responsive to the video frame being qualified as a new road marking template; and a computer processor configured to execute the road marking detection module.

22. The computer system of claim 21, further comprising:

a template learning module configured to:
- receive a set of training images, each training image contains a type of road marking and identification of the road marking; and
- learn a plurality of road marking templates from the set of training images.

23. The computer system of claim 22, wherein the template learning module is further configured to:

for each training image:
- rectify the training image by compensating lens and distortion of a camera that captures the training image;
- detect one or more regions of interest on the training image;
- detect one or more feature description key points in each detected region of interest;
- extract one or more feature vectors for each detected key point;
- generate the plurality of road marking templates from the extracted feature vectors of the detected key points; and
- store the plurality of road marking templates for runtime road marking detection.

* * * * *